Figure 1:
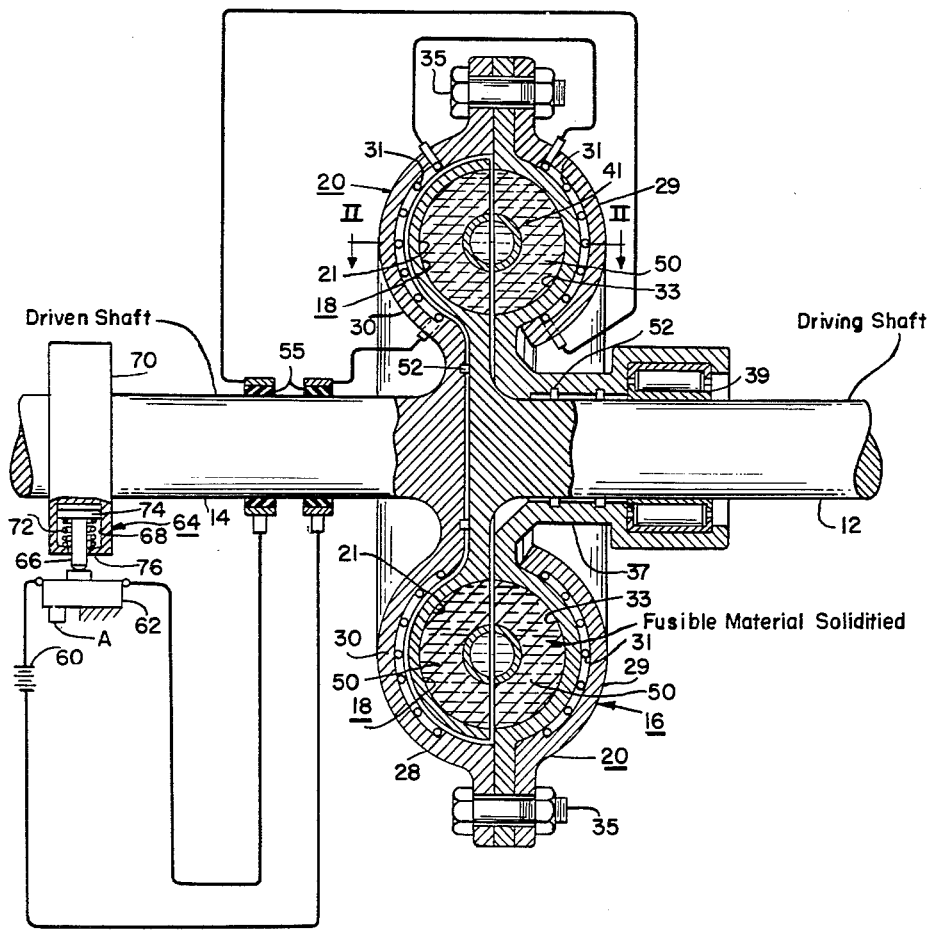

INVENTORS
JOHN A. MAYHALL,
JOHN S. KARBOWSKI.
BY

United States Patent Office 2,942,706
Patented June 28, 1960

2,942,706
CLUTCH

John A. Mayhall and John S. Karbowski, Kansas City, Mo., assignors to Westinghouse Electric Corporation, East Pittsburgh, Pa., a corporation of Pennsylvania Filed June 9, 1958, Ser. No. 740,701

7 Claims. (Cl. 192—3.2)

This invention relates to clutches, more particularly to clutches employed to provide a rigid connection between shafts and has for an object to provide an improved clutch of this type.

In some mechanisms relative movement is desired, during certain phases of operation, between shafts connected by a coupling. This relative movement exists in fluid clutches, as is well known. During other phases of operation of these mechanisms, it is desired that the shafts rotate at the same speed. In the latter instance, for example, a rigid connection between the shafts will display this characteristic.

One of the features of the present invention is the combination in one clutch of the characteristic of relative movement between shafts during one period of operation and the characteristic of no relative movement during another period of operation. Also, in the clutch of the present invention, the transition from one type of operation to the other is attained expeditiously and in a simple manner.

One instance where it is desirable to utilize a clutch constructed in accordance with the present invention is in a connection for rotors of a multiple rotor aviation gas turbine unit in which first and second rotors are disposed in tandem. Here, in starting, it is desirable to rotate the first rotor at a speed sufficient to start the gas turbine and thereafter to interlock the first and second rotors for joint rotation. In this manner the amount of outside power required to start the unit is reduced below that which would otherwise be required if both rotors are inseparably joined.

One embodiment of the present invention comprises a clutch having a driving housing rigidly connected to a driving shaft and a driven housing rigidly connected to a driven shaft. The housings jointly define a chamber in which are disposed vanes defining passages. A fusible material that is solid at the highest temperature to which the clutch is exposed but which becomes fluid at a still higher temperature fills the chamber.

A heating element supplies heat to the material which thus becomes fluid and jointly with the passages provides a fluid coupling between the driven and driving housings. The fluid coupling is converted into a rigid connection at a predetermined speed by providing means responsive to the rotary speed of the driven housing to terminate the supply of heat to the coupling and allow the material to cool and solidify, thereby forming a rigid mass in which the vanes are embedded.

Figure 2:
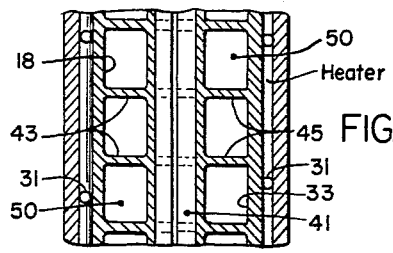

The foregoing and other objects are effected by the invention as will be apparent from the following description and claims taken in connection with the accompanying drawings, forming a part of this application, in which:

Fig. 1 is an axial sectional view of a clutch incorporating the present invention, in which a portion of the structure is shown diagrammatically; and Fig. 2 is a developed fragmentary sectional view taken along the line II—II of Fig. 1, and looking in the direction indicated by the arrows.

Referring to Fig. 1, there are shown coaxial and relatively rotatable driving and driven shafts or members 12 and 14, respectively. Connected to the driving and driven shafts is a clutch structure 16 of generally toroid shape which is divided into an annular driving housing or impeller 18 and a driven housing or runner 20. The driving housing 18 comprises an annular portion 21 which is semi-circular in cross-section and rigidly connected to the driving shaft 12.

The driving housing 18 is enclosed by the driven housing 20. The driven housing 20 is substantially circular in cross-section except for the opening through which the driving housing 18 extends and comprises wall structure which includes annular and semi-circular (in cross-section) segments 29 and 30, the segment 30 being disposed on the left and rigidly connected to the driven shaft 14. Within the segments 29 and 30 is embedded an electrical heating element 31. Mounted between the segments 29 and 30 is an annular wall member 33 of semi-circular cross-section, coaxial with and facing the driving housing 18, and rigidly connected by a peripheral flange to flanges of the segments 29 and 30 by nuts and bolts 35 or other suitable means. The wall member 33 is provided with a tubular sleeve portion 37 encompassing the driving shaft 12, and rotatably supported thereon by a roller bearing structure 39.

The driving housing 18 and the wall member 33 jointly define an annular chamber 41 of toroidal shape. As illustrated in Fig. 2, annular rows of vanes 43 and 45 integral with the driving housing 18 and the wall member 33, respectively, project into the chamber 41. The vanes 43 are spaced axially from the vanes 45 with the adjacent vanes of one row together with those of the other row forming circular passages 50 for the flow of fluid therethrough, as illustrated in Figs. 1 and 2. Suitable fluid retaining seals 52 are provided within the clutch.

Within the chamber 41 is disposed a mass of suitable fusible material capable of changing physical state at different temperature values in response to the heat supplied by the heating element 31. As well known, fusible materials usually expand as they solidify. The specific type of material is not critical. However, by way of example, a suitable material is tin which is fluid at or above 450° F. and solid below 450° F.

The heating element 31 is disposed in heat transfer relation with the foregoing material and supplies the heat necessary to render the material fluid. The material is solidified by deenergizing the heating element 31 and by disposing the clutch 16 in an ambient having a temperature low enough to cool the various elements of the clutch sufficiently to solidify the material.

Suitable wires and brushes connect the heating element 31 to slip rings 55 disposed on the driven shaft 14. The slip rings 55 are, in turn, connected by wires to a suitable source of power 60. Interposed between the power source 60 and one of the slip rings 55 is a switch 62 which is mounted on suitable stationary structure adjacent the driven shaft 12. The switch 62 is preferably of the well known over-center snap-acting type and is manually resettable to the closed position by a member A. The switch 62 is actuated to the open position at a preselected speed of rotation of the driven shaft by a speed responsive mechanism 64 disposed on the driven shaft 14. The mechanism 64 comprises a pin 66 radially slidable within a bore 68 in a collar 70 formed on the driven shaft 14 and the pin 66 is biased radially inward by a spring 72 disposed between a shoulder 74 formed on the pin 66 and a neck portion 76 formed at one end portion of the bore 68.

In starting, before the driving shaft 12 is initially rotated, the switch 62 is manually set in the closed position by depressing the member A and the heating element 31 is energized, thereby supplying the heat required to make the material fluid. When the material becomes fluid the driving shaft is rotated by suitable means (not shown).

Upon rotation of the driving shaft 12, the vanes 43 and 45 cooperate in the usual manner to establish a fluid coupling between the shafts 12 and 14. That is, as the fluid within that portion of the passages 50 defined by the vanes 43 is subjected to the influence of centrifugal force it will first flow radially outwardly and thereafter radially inwardly through that portion of the passages 50 defined by the vanes 45, thus establishing a fluid coupling between the shafts 12 and 14, in a manner well known in the art. The speed of rotation of the driving shaft is increased gradually to its running speed but because of the slippage or relative movement between the driven and driving housing 18 and 20, respectively, which is inherent in such couplings, the rate of acceleration of the driven housing 20 is lower than that of the driving shaft. When the speed of the driven shaft approximates the running speed of the driving shaft the centrifugal force of the pin 66 overcomes the inward bias of the spring 72 sufficiently to open the switch, thereby deenergizing the heating element 31 and terminating the heat supply required to maintain the material in fluid form.

Upon solidification of the material, the vanes 43 and 45 become embedded within the solid material and jointly therewith provide a rigid connection between the housing 18 and 20. In addition to the solidification, consequent expansion of the material between the housings 18 and 20 places it under compression. This compression binds the material to the surfaces of the housings 18 and 20 which define the chamber 41.

After a rigid connection has been provided, the speed of the shaft 12 may be varied as desired without affecting the rigid coupling connection, since the switch 62 is of the type which will remain open until it is reset and the heater 31 will not be energized until the member A is again reset and the speed of the shaft 14 is below the running speed.

The present invention may be utilized in conjunction with an aviation gas turbine unit (not illustrated) having two rotors disposed in tandem, in which the driving shaft 12 is connected to a main or first compressor and turbine rotor and the driven shaft 14 is connected to a ducted fan or second rotor so that the main rotor may be initially rotated by a starting device outside of the gas turbine unit, and after combustion is initiated the second rotor is rigidly interlocked therewith. Thus, the unit may be started without imposing on the starting device the full load of the ducted fan.

In certain applications, the clutch structure of the present invention may be disposed in an ambient which does not have a temperature sufficiently low enough to cool and solidify the fusible material or, in other applications, a faster rate of solidification than would be provided by exposing the clutch structure to a low ambient temperature may be desired. For these purposes, a suitable cooling device, such as a fan for supplying it with cooling air, or a pump and a nozzle for supplying the clutch structure with cooling water in heat transfer relation with the clutch structure may be provided.

From the foregoing it is seen that a clutch has been provided which functions as a fluid connection and as a rigid connection between the driving and driven shafts depending upon whether the material within the clutch is fluid or solid.

While the invention has been shown in but one form, it will be obvious to those skilled in the art that it is not so limited, but is susceptible of various changes and modifications without departing from the spirit thereof.

What is claimed is:

1. A clutch for coupling a driving member and a driven member comprising housings connected to each of said members, said housings being rotatable relative to each other, said housings jointly defining a chamber, a fusible material within said chamber capable of changing from a solid state at one temperature to a fluid state at a higher temperature, said fusible material rigidly connecting said housings when in the solid state, means for initially heating said material to the fluid state, and means responsive to a preselected speed of one of said members for deenergizing said heating means.

2. A clutch for coupling a driving member and a driven member comprising housings connected to each of said members, said housings being rotatable relative to each other, said housings jointly defining a chamber, a fusible material within said chamber capable of changing from a solid state at one temperature to a fluid state at a higher temperature, said fusible material rigidly connecting said housings when in the solid state, means for initially heating said material to the fluid state, means responsive to a preselected speed of one of said members for deenergizing said heating means, and fluid means for cooling said material to the solid state upon the deenergization of said heating means.

3. A clutch for coupling a driving shaft and a driven shaft comprising housings connected to each of said shafts, said housings being rotatable relative to each other and jointly defining a chamber, a fusible material within said chamber capable of changing from a solid state at one temperature to a fluid state at a higher temperature, said fusible material having a larger volume when solid than when fluid, said fusible material rigidly connecting said housings when in the solid state, means for initially heating said material to the fluid state, and means for subsequently deenergizing said heating means at a preselected speed of said driven shaft.

4. A clutch for coupling a driving shaft and a driven shaft comprising an impeller structure connected to one of said shafts, a runner structure secured to the other of said shafts, said structures jointly defining a chamber, a fusible material within said chamber which is a fluid at one temperature and a solid at a lower temperature, said fusible material providing a fluid coupling between said impeller and runner structure when fluid and a rigid coupling therebetween when solid, means for subsequently heating said material to said one temperature, and means responsive to the speed of rotation of said driven member for deenergizing said heating means, said fusible material having the property of expanding as it solidifies, thereby binding to said impeller and runner structures.

5. A clutch comprising rotatable driving and driven housings, said driving and driven housings jointly defining a chamber, vanes connected to said driving and driven housings, said vanes extending into said chamber, a fusible material within said chamber, said material being a fluid at one temperature and a solid at a lower temperature, means for subsequently supplying heat to said material and maintaining it fluid, said vanes and said material jointly providing a fluid coupling between said housings when said material is fluid, means responsive to a preselected speed of one of said housings for terminating the supply of heat to said material, whereupon said material cools and solidifies, said vanes becoming embedded in the solid material and forming a rigid connection between said driven and driving housings.

6. A clutch comprising rotatable driving and driven shafts, an impeller structure connected to one of said shafts, a runner structure secured to the other of said shafts, said structures jointly defining an annular chamber, a plurality of vanes secured to said structures and projecting into said chamber, said vanes defining passages, the vanes on one of said structures being spaced axially from the vanes on the other of said structures, a fusible material within said chamber which is fluid at one temperature and solid at a lower temperature, an electric heating element for supplying heat to said material, said material jointly with said passages providing a fluid coupling between said structures when said material is fluid, switch means for controlling said heating element and means responsive to the speed of rotation of said driven shaft for actuating said switch, whereby said material cools and a rigid connection forms between said structures.

7. A clutch for coupling coaxial relatively rotatable driven and driving shafts comprising a runner structure and an impeller structure jointly defining a chamber, said runner structure being connected to one of said shafts and said impeller structure being connected to the other of said shafts, said runner structure having a plurality of fluid conducting passages within said chamber, said impeller structure having a plurality of fluid conducting passages within said chamber, a fusible material within said chamber which is fluid at one temperature and solid at a lower temperature, said second mentioned passages being adapted to cooperate with said first mentioned passages and said material when fluid to provide a fluid coupling between said structures, an electrical heating element for supplying heat to said material and maintaining said material in the fluid state, manually resettable control means for deenergizing said heating element at a preselected speed of said driven shaft, whereby said material cools to the lower temperature, whereupon said material solidifies and a rigid connection forms between said runner and impeller structures.

References Cited in the file of this patent

UNITED STATES PATENTS

| | | |
|---|---|---|
| 2,164,173 | Durrell et al. | June 27, 1939 |
| 2,184,606 | DeLavaud | Dec. 26, 1939 |
| 2,539,534 | Eckhardt | Jan. 30, 1951 |
| 2,643,748 | White | June 30, 1953 |